Jan. 5, 1943.   H. M. BASCOM   2,307,660
INDICATOR
Filed Nov. 26, 1941   2 Sheets-Sheet 1

INVENTOR
H. M. BASCOM
BY
John A. Hall
ATTORNEY

Jan. 5, 1943. H. M. BASCOM 2,307,660
INDICATOR
Filed Nov. 26, 1941 2 Sheets-Sheet 2

INVENTOR
H. M. BASCOM
BY
John A. Hall
ATTORNEY

Patented Jan. 5, 1943

2,307,660

UNITED STATES PATENT OFFICE 2,307,660

INDICATOR

Henry M. Bascom, New York, N. Y., assignor to Bell Telephone Laboratories, Incorporated, New York, N. Y., a corporation of New York Application November 26, 1941, Serial No. 420,525

7 Claims. (Cl. 177—327)

This invention relates to signaling devices and especially to number indicators useful for the display of telephone numbers before operators.

The object of the invention is to provide a simple and economical device which will respond to trains of impulses representing numbers and translate such trains of impulses into visual indications of the corresponding numbers.

The device consists essentially of a row of movable shutters in physical contact with each other. A blow on the end of one of said shutters will be transmitted through the whole line and will cause the one at the other end to move away, a second blow will cause a second to move away, and so on. When the operation is over the shutters will be formed into two series, one consisting of those which have been moved and corresponding in number to the number of impulses in the series being registered for display and the other consisting of those which have not been moved. The space between these two rows of shutters will be used for the display of a corresponding number by appropriate illumination or otherwise.

In order to prevent a rebound of a shutter, the shutters may be made of magnetic material and placed in a magnetic circuit. Such circuit will contain a major air-gap corresponding substantially to the dimension of a shutter and division of the shutters into any given groups will be maintained by the magnetism therein. The blow which will detach an end shutter from one group and add it to another will be sufficient to overcome the magnetic effect which holds them in contact with one another but will be insufficient to store enough energy in the detached shutter to create enough rebound when such shutter comes into contact with the other group to overcome the magnetic effect at that point.

The shutters may be fashioned in a number of ways. They may be spherical in shape or cylindrical discs set on edge, or they may be pivoted members. The prime requirement is that they be resilient and in physical contact with one another. Another consideration is that their inertia be small enough so that response to a series of rapidly securring impulses will be accurate.

The number indicator may consist of a sufficient number of individual indicators, one for each digit of a number to be displayed and a common hammer may be used for all the said indicators. Thus, when used in telephone working, the hammer may be operated by the usual fast relay which responds to the individual impulses of a train of dial impulses and the hammer may be advanced from association with one to another indicator by the usual slow releasing relay. By such a simple arrangement many of the complicated circuit arrangements usually employed in call indicator working may be avoided.

When the function of the indicator has been performed, the series of shutters which have been displaced may be restored by a simple plunger arrangement which will simultaneously impel the displaced shutters into their normal positions.

The drawings consist of two sheets having eight figures as follows.

Figure 1:
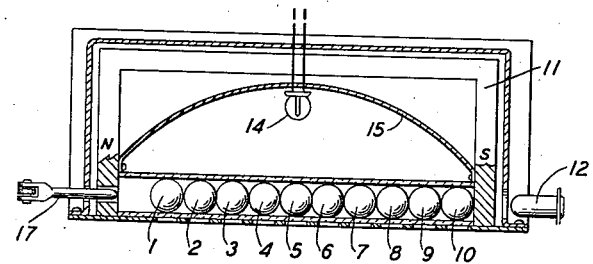
Fig. 1 is a plan view partly in section of a single indicator by means of which the principle of operation of the invention may be explained.

The indicator consists essentially of a row of steel or other magnetic material balls 1 to 10, placed in a runway where they can move in one direction. A permanent magnet 11 is provided to hold them in any one position against casual movement. A hammer 12, operated by a magnet 13 is provided for moving the balls. In the position shown in Fig. 1 each ball obscures a window for displaying a corresponding numeral or other character by light transmitted from a lamp 14, properly diffused by a reflector 15. If the magnet 13 is operated once as by a single pulse, the hammer 12 will strike the adjacent pole of the magnet 11 and since the balls are in physical contact with each other and ball 10 is in physical contact with the said pole of the magnet 11, the result will be that ball 1 will be detached from the string and move into physical contact with the other pole of the magnet 11. The first window normally obscured by ball 1 will now be unobscured and the numeral 1 will be displayed. If, by way of example, the magnet 13 is operated five times as by five succeeding pulses balls 1, 2, 3, 4 and 5 will be successively moved toward the left, one for each pulse or operation of the hammer 12 by the magnet 13. At the end of this train of pulses the numeral five will be displayed since ball 2 normally obscuring window 2 will be moved by the second impulse to make contact with ball 1 and will then be so located as to obscure window 1, and balls 3, 4 and 5 will be similarly moved to obscure windows 2, 3 and 4 leaving window 5 unobscured.

The indications being observed, the indicator may be returned to normal through the operation of the restoring magnet 16 which will push a nonmagnetic pin 17 through an appropriate opening in the left-hand end of the magnet 11 to return the balls to the position shown in Fig. 1.

Figure 2:
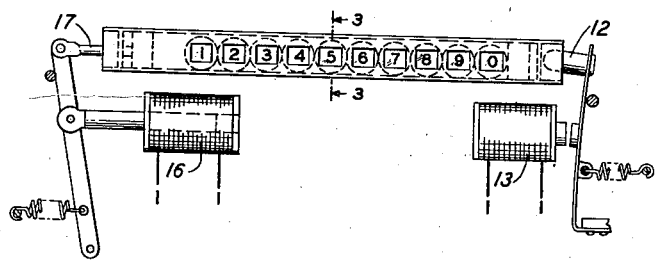
Fig. 2 is a front view of the same.
Figure 3:
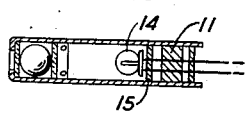
Fig. 3 is a fragmentary sectional view taken along the line 3—3 of Fig. 2.
Figure 5:
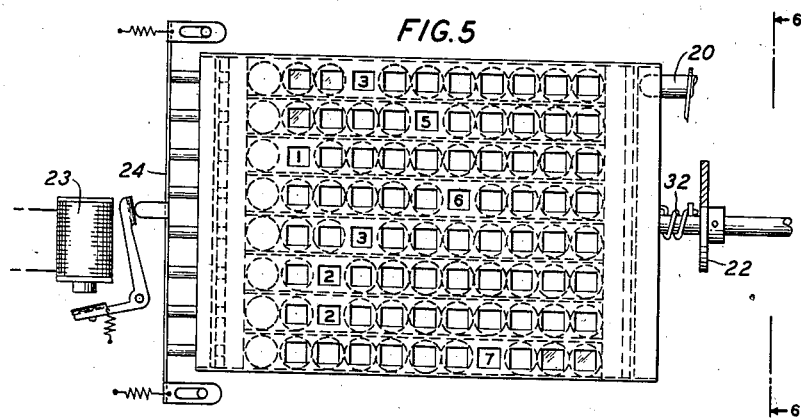
Fig. 5 is a front view of the same.
Figure 6:
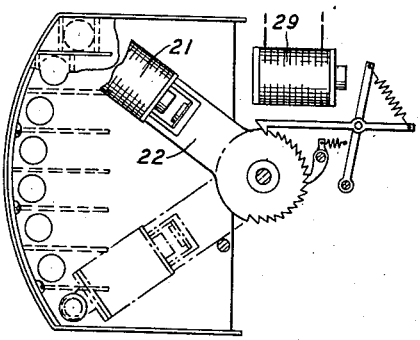
Fig. 6 is a side view taken along the line 6—6 of Fig. 5.

A plurality of the devices such as that shown in Figs. 1, 2 and 3 may be combined to produce an indicator such for instance as a call indicator as used in telephone installations. In such cases the permanent magnet used for holding the balls in any given position may be appropriately designed. As shown in Fig. 6 it is slotted at one end so that the impulse transmitted by the hammer 20 when this hammer is cooperatively associated with a particular row will not be transmitted to the balls of any other row. The hammer 20 is operated by a magnet 21 mounted on an arm 22 by means of which and through a step-by-step motion such hammer may be cooperatively associated with each separate indicator in turn. By this means the complete indicator may be made to display a telephone number. Reading the indicators from the bottom up in Fig. 5 it will be noted that the number 72236153 is indicated. When such a number has been observed the balls of all the indicators may be restored to their normal positions by operation of the restoring magnet 23 which will move a plate 24 toward the right and push a nonmagnetic pin along the axis of each row of balls.

Figure 7:
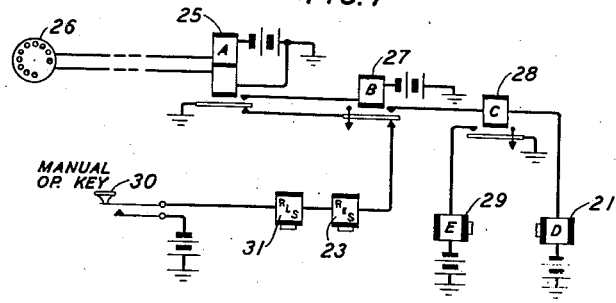
Fig. 7 is a circuit diagram illustrating the fundamental circuit conditions for operating the device of Figs. 4, 5, 6 and 8.
Figure 4:
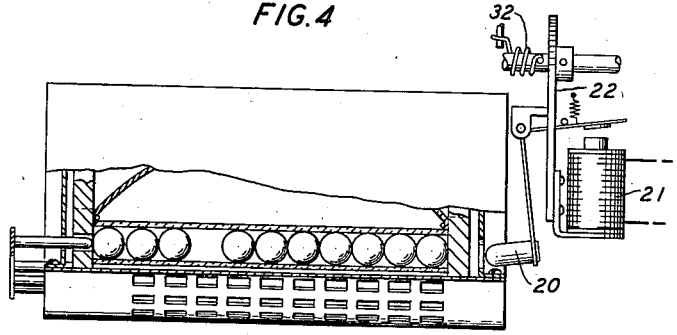
Fig. 4 is a view similar to Fig. 1 of an indicator comprising a plurality of devices such as that shown in Fig. 1.

It should be noted that for the convenience of those skilled in the art and especially those familiar with step-by-step working that certain letter characters have been added to the various pieces of apparatus in the circuit of Fig. 7. Since the line relay is commonly spoken of as the A relay, the letter A has been used in connection with relay 25, the letter B in connection with the first slow relay 27, the letter C in connection with the second slow relay 28, the letter D in connection with the stepping magnet 21 and so forth. Magnet 23 is also designated RES for restoring and magnet 31 is designated REL for releasing. These letter characters thus aid many who will read this specification to an immediate understanding of the functions of this apparatus without the necessity for studying the description.

Such an indicator may be operated by a circuit fundamentally the same as that used in step-by-step automatic switch operation. A line relay 25 will respond to any source of pulses, here indicated as a dial 26. When the relay 25 is operated it will attract its armature and cause the operation of the first slow relay 27. Relay 27 prepares for the operation of the second slow relay 28 and the operating magnet 21. When the train of impulses is transmitted each pulse will cause a momentary release of the line relay 25, whereupon the relay 28 and the magnet 21 will be operated. Relay 28 will respond to the train of impulses as a whole and magnet 21 will respond to each separate impulse. The operation of relay 28 will result in the operation of magnet 29 which will prepare to move the arm 22 forward one step. The normal position of this arm with the hammer 20 in cooperative relationship with the lowermost indicator (Fig. 5) is indicated by dotted lines in Fig. 6. At the end of the train of pulses relay 28 releases and this is followed by the release of magnet 29 and the advancement of the arm 22 one step.

When the indicator is completely set the line relay will be released. After an appropriate period the first slow relay 27 releases and prepares a release circuit. This is shown herein as being controlled by a manually operated key 30. The operator having observed the number indicated presses the button 30 and closes the circuit for energizing the release magnet 31 and the restoring magnet 23. The restoring magnet will restore all the balls to their normal positions and the release magnet will, in the well known manner, release the arm 22 so that it will move under the power of the spring 32 to its normal position.

Figure 8:
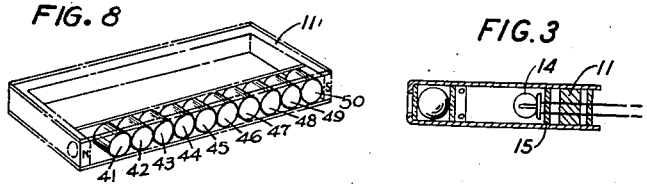
Fig. 8 is a perspective view of certain elements of the invention showing the shutters in the shape of cylindrical rollers, or discs, the proper appellation depending on the longitudinal dimension. A very short roller may be termed a disc.

It should be noted that the spherical balls shown may be replaced by short cylindrical rollers 41 to 50 inclusive as shown in Fig. 8 or any other appropriately movable pieces. The one requirement is that such pieces be of magnetic material so as to be held in any given position in physical contact with one another and that they have sufficient resiliency so that the impact of the hammer will be transmitted through a row of them to move the last one away.

What is claimed is:

1. A device for displaying characters of known significance, comprising a display area having thereon a plurality of significant designations, a row of shutters normally concealing said designations, said shutters being constructed of resilient material and being in physical contact with each other, means for displacing said shutters, comprising a hammer arranged to strike an end shutter to move the shutter at the other end of said row and to expose to view the said significant designation concealed thereby, the number of said shutters moved and the significant designation exposed being in direct relation to the number of operations of said hammer, and restraining means for holding said shutters in either their normal or their operated positions.

2. A device for displaying characters of known significance, comprising a display area having thereon a plurality of significant designations, a row of shutters normally concealing said designations, said shutters being constructed of resilient magnetic material, a magnetic circuit including said row of shutters for holding said shutters in physical contact with each other, means for displacing said shutters comprising a hammer arranged to strike an end shutter to move the shutter at the other end of said row and to expose to view the said significant designation concealed thereby, the number of said shutters moved and the significant designation exposed being in direct relation to the number of operations of said hammer.

3. A device for displaying characters of known significance, comprising a display area having thereon a plurality of significant designations, a row of spheres of magnetic material normally concealing said designations, a magnetic circuit including said row of spheres for holding said spheres in physical contact with each other, means for displacing said spheres comprising a hammer arranged to strike an end sphere to move the sphere at the other end of said row and to expose to view the said significant designation concealed thereby, the number of said spheres moved and the significant designation exposed being in direct relation to the number of operations of said hammer.

4. A device for displaying characters of known significance, comprising a display area having thereon a plurality of significant designations, a row of cylindrical discs of magnetic material normally concealing said designations, a magnetic circuit including said row of cylindrical discs for holding said cylindrical discs in physical contact with each other, means for displacing said cylindrical discs comprising a hammer arranged to strike an end cylindrical disc to move the cylindrical disc at the other end of said row and expose to view said significant designation concealed thereby, the number of said cylindrical discs moved and the significant designation exposed being in direct relation to the number of operations of said hammer.

5. A device for displaying characters of known significance, comprising a display area having thereon a plurality of significant designations, a row of shutters normally concealing said characters, said shutters being constructed of resilient magnetic material, a magnetic circuit including said row of shutters for holding said shutters in physical contact with each other, said magnetic circuit having a major air-gap substantially of the dimension of one of said shutters whereby when one of said shutters is moved across said air-gap it will be magnetically held in its displaced position, means for displacing said shutters comprising a hammer arranged to strike an end shutter to move the shutter at the other end of said row across said air-gap and to expose to view the said character concealed thereby, the number of said shutters moved and the character exposed being in direct relation to the number of operations of said hammer.

6. A device for displaying characters of known significance, comprising a display area having thereon a plurality of significant designations, means for illuminating said display area, a row of shutters normally concealing said designations, said shutters being constructed of resilient magnetic material, a magnetic circuit including said row of shutters for holding said shutters in physical contact with each other, means for displacing said shutters comprising a hammer arranged to strike an end shutter to move the shutter at the other end of said row and to expose to view the said character concealed thereby, the number of shutters moved and the character exposed being in direct relation to the number of operations of said hammer.

7. A device for displaying characters of known significance, comprising a display area having thereon a plurality of significant designations, a row of shutters normally concealing said designations, said shutters being constructed of resilient magnetic material, a magnetic circuit including said row of shutters for holding said shutters in physical contact with each other, means for displacing said shutters comprising a hammer arranged to strike an end shutter to move the shutter at the other end of said row and to expose to view the said character concealed thereby, the number of said shutters moved and the character exposed being in direct relation to the number of operations of said hammer and means for moving said displaced shutters to their normal positions.

HENRY M. BASCOM.